United States Patent [19]

Stauffer

[11] Patent Number: 5,672,747
[45] Date of Patent: Sep. 30, 1997

[54] PHOSGENE PROCESS

[76] Inventor: John E. Stauffer, 6 Pecksland Rd., Greenwich, Conn. 06831

[21] Appl. No.: 649,157

[22] Filed: May 17, 1996

[51] Int. Cl.$^6$ ................................................ C07C 51/58
[52] U.S. Cl. ............................................................ 562/847
[58] Field of Search ............................................. 562/847

[56] References Cited

U.S. PATENT DOCUMENTS

| 1,231,226 | 6/1917 | Whitehouse . | |
|---|---|---|---|
| 1,360,312 | 11/1920 | Peacock . | |
| 1,457,493 | 6/1923 | Bradner . | |
| 1,746,506 | 2/1930 | Williams . | |
| 2,847,470 | 8/1958 | Douthitt . | |
| 3,364,272 | 1/1968 | Ager | 562/847 |
| 3,996,273 | 12/1976 | Daumas | 562/847 |

*Primary Examiner*—Paul J. Killos
*Attorney, Agent, or Firm*—Young & Basile, P.C.

[57] ABSTRACT

A process for the production of phosgene ($COCl_2$) comprising first reacting perchloroethylene ($CCl_2$=$CCl_2$) with hydrogen chloride and oxygen in the presence of a first catalyst to give hexachloroethane and water, separating the hexachloroethane, and second reacting the hexachloroethane from the first step with carbon monoxide in the presence of a second catalyst to produce perchloroethylene and phosgene which is separated from the perchloroethylene before the latter is recycled to the first step.

6 Claims, 2 Drawing Sheets

FIG - 1  PHOSGENE PROCESS

PHOSGENE PROCESS

FIELD OF THE INVENTION

This invention relates to a novel method for the production of phosgene from carbon monoxide, hydrogen chloride and oxygen. The process comprises two steps operated in tandem. In the first step, perchloroethylene is reacted with hydrogen chloride and oxygen in the presence of an oxychlorination catalyst to produce hexachloroethane and water. In the second step hexachloroethane from the first step is reacted with carbon monoxide to form perchloroethylene and phosgene. A catalyst is used in the second step to promote the reaction. Phosgene from the second step is separated from the perchloroethylene which is recycled to the first step.

BACKGROUND OF THE INVENTION

Phosgene ($COCl_2$), also known as carbonyl chloride, was first synthesized in 1812 by the British chemist, John Davy. He reacted carbon monoxide with chlorine in the presence of sunlight; hence the derivation of the name phosgene from the Greek phos (light) and genes (born). For many years phosgene remained a laboratory curiosity. Then during World War I the compound, which is highly toxic, was used as a poison gas in trench warfare.

Today phosgene is manufactured in large quantities for use as an intermediate in chemical synthesis. It is employed in the preparation of isocyanates, which are used in polyurethane foams and resins. Phosgene is also required in the manufacture of polycarbonates and in the synthesis of chloroformates and carbonates, which are used as intermediates in the production of pharmaceuticals and pesticides. In many of these applications, hydrogen chloride is produced as a byproduct when phosgene is reacted with amines, alcohols, carboxylic acids and other reactants. This byproduct hydrogen chloride must be recovered or neutralized before it is discarded.

The modern process for the manufacture of phosgene consists of the reaction of carbon monoxide with chlorine gas over a catalyst at elevated temperatures. The process is relatively simple and high yields of product can be obtained. Still, certain problems are encountered. The reaction is highly exothermic, thus requiring extensive cooling of the reactor. Even so, the reaction is hard to control and hot spots in the catalyst bed are difficult to avoid.

Because of the extreme toxicity of the compound, phosgene is generally produced at the site where it is consumed. Thereby hazardous shipment and storage of the material are avoided. In spite of these precautions, there remains the necessity of supplying chlorine to the process. While not nearly so dangerous as phosgene, chlorine is in itself a highly toxic compound.

Finally, there are considerations of economics. Chlorine, a product of electrochemistry, is a relatively expensive raw material notwithstanding the large quantities of it produced. By contrast, hydrogen chloride, as already noted, is widely available as a byproduct and can be obtained at very favorable cost.

It is therefore an object of the present invention to provide a method for the production of phosgene that overcomes or avoids the disadvantages of conventional processes.

Furthermore, it is an object to be able to substitute a less expensive raw material, namely, hydrogen chloride, for chlorine, which is with few exceptions more costly. An additional goal is to provide a process in which the chlorination of carbon monoxide is easier to control.

These and other objects, features and advantages of the invention will be apparent from the following description and the accompanying drawings.

SUMMARY OF THE INVENTION

The invention in one preferred embodiment concerns a process for the production of phosgene from carbon monoxide, hydrogen chloride and oxygen. The process includes two reaction steps operated in tandem and in separate reaction zones. In the first zone, hydrogen chloride is converted to chlorine. A carrier in the form of hexachloroethane ($CCl_3CCl_3$) transports the chlorine to the second zone where the chlorine is released and reacted with carbon monoxide to form phosgene.

The reaction which takes place in the first reaction zone is generally known as oxychlorination C. In this zone perchloroethylene ($CCl_2=CCl_2$), with the synonym tetrachloroethylene, is reacted with hydrogen chloride and oxygen to give hexachloroethane and water. An oxychlorination catalyst is required in order to promote this reaction. The catalyst of choice is copper chloride, usually deposited on an inert support. This is the well-known Deacon catalyst which has been used in many forms, often combined with such salts as potassium chloride, ferric chloride and chromic chloride to promote its effectiveness. The reaction temperature is in the range of about 200° to about 375° C.

In the second reaction zone, hexachloroethane, produced in the first step, is reacted with carbon monoxide to generate phosgene and perchloroethylene. To promote this reaction a catalyst such as activated carbon is required. The temperature range for the reaction is from about 200° to about 400° C.

The effluent from the second reaction zone is fractionated to produce the phosgene product. The separated perchloroethylene is recycled to the first reaction zone. In this manner a continuous process is provided whereby there is no net consumption or accumulation of perchloroethylene.

The reactions of the present invention are illustrated by the following equations:

Combining these equations the net reaction can be shown to be:

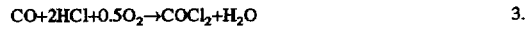

This latter equation, however, is only representative of the overall results; it cannot be carried out in a single step because phosgene is decomposed by water. Thus, by using two reaction zones and maintaining the second one under anhydrous conditions, use of hydrogen chloride as a raw material for the production of phosgene is made feasible.

DETAILED DESCRIPTION OF THE PROCESS

Figure 1:
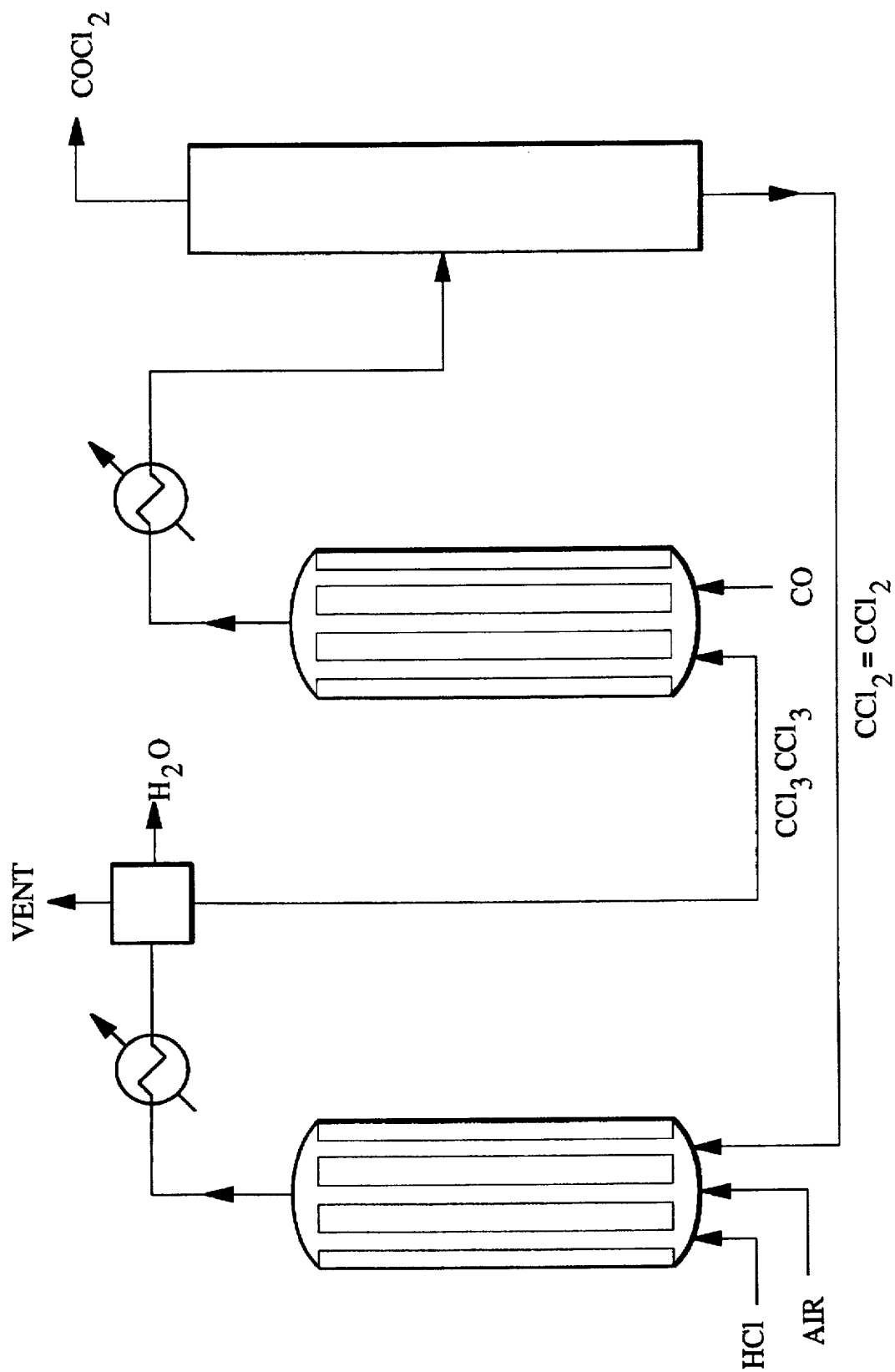
FIG. 1 is a diagrammatic representation of a preferred means for operating the present invention. It illustrates the two reaction zones along with connecting lines and means for product purification.

A schematic flow sheet of one preferred embodiment of the process is illustrated in FIG. 1. This diagram shows two catalytic reactors which embody the first and second reaction zones of the process. In addition, a distillation column is provided in order to achieve product separation. The minimal connecting lines which are required are also shown to indicate the flow of materials.

In the first catalytic reactor, oxychlorination of perchloroethylene is carried out. This is a reaction which has been investigated in some detail for other starting materials. It requires a catalyst which is usually specified as a copper salt enhanced by the addition of one or more other salts including those of iron, potassium, chromium, lead and rare earths. The literature describes many such combinations. These salts may be deposited on a support or used in the molten state.

The oxychlorination reaction is exothermic such that considerable heat is given off. In order to control the temperature of the reaction, this heat must be removed in an efficacious manner. The present invention contemplates the use of a shell and tube reactor for this purpose although other means such as a fluidized bed may be employed.

The temperature of the oxychlorination reaction is maintained in the range of about 200° to about 375°. This range is dictated by considerations of equilibrium and reaction rates. At lower temperatures, the reaction would proceed less vigorously. At higher temperatures the conversion per pass is limited. Although the reaction proceeds effectively at one atmosphere pressure, elevated pressures may be used for the purposes of reducing equipment size or increasing the heat transfer efficiency.

The reactants of the oxychlorination reaction are perchloroethylene, hydrogen chloride, and oxygen. Air may be substituted for all or part of the oxygen depending on the availability of supplies. The products of the oxychlorination reaction are hexachloroethane and water. Inerts, that is, nitrogen from the air, must be vented via a suitable system (not shown) to control volatile emissions.

Before the hexachloroethane can be used in the second catalytic reactor, it must be separated from the water and dried. Any residual moisture will decompose the phosgene product.

As the process is envisioned, the second catalytic reactor is also of a shell and tube design in order to provide effective temperature control. The reaction of hexachloroethane with carbon monoxide is slightly endothermic requiring the input of heat to maintain the specified temperature. This result is in marked contrast to the reaction of chlorine with carbon monoxide, which is highly exothermic.

The temperature range for the reaction of hexachloroethane with carbon monoxide to produce phosgene and perchloroethylene is determined by thermodynamics. Using published values for enthalpies and Gibbs energies of formation for each of the reactants and products in equation 2, the following relationship was derived:

$$\log K_p = -1170(1/T) + 2.97$$

where $K_p$ is the equilibrium constant and T is the absolute temperature in degrees Kelvin. This relationship is plotted in FIG. 2.

Figure 2:
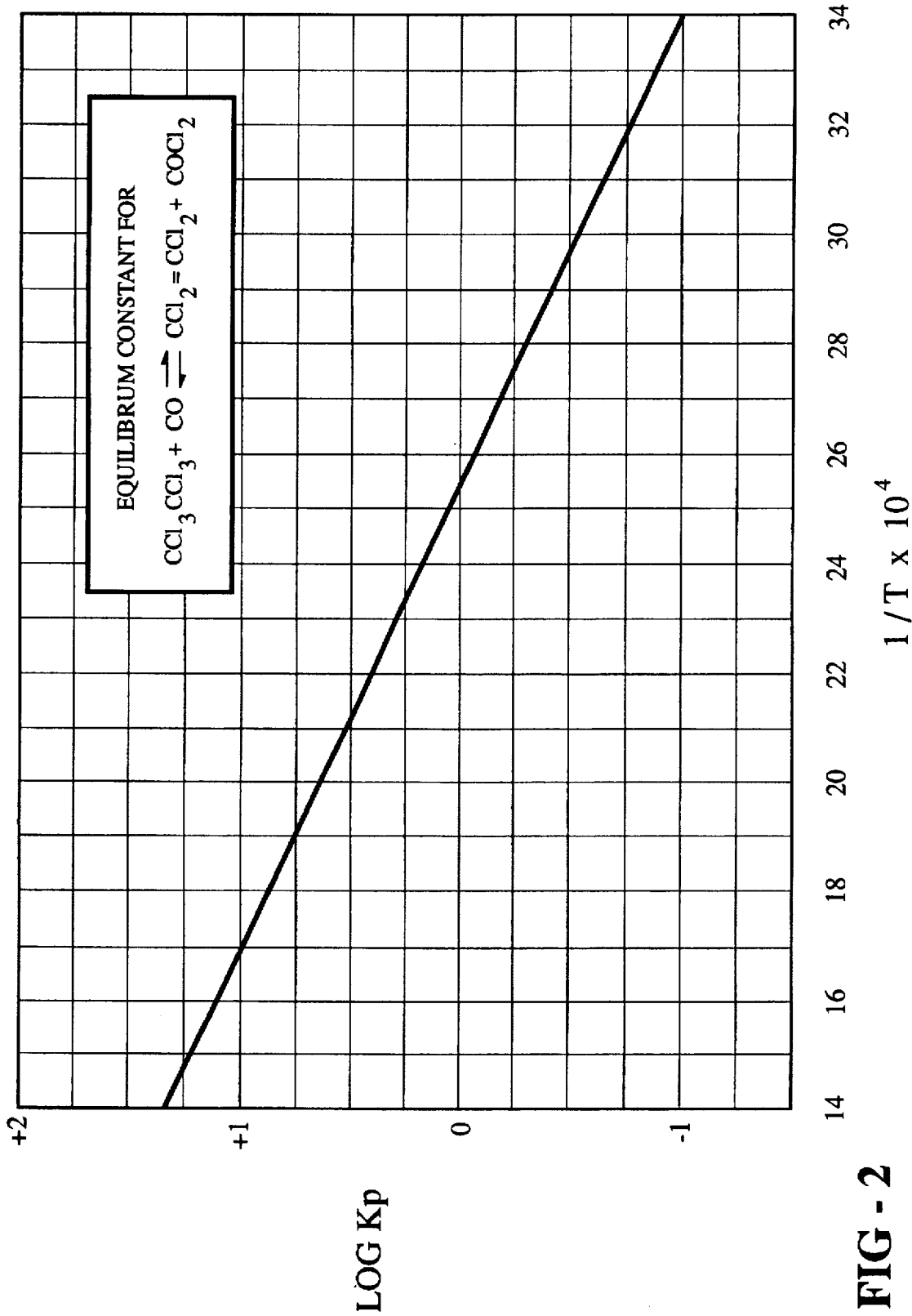
FIG. 2 is a graph showing the equilibrium constant for the reaction of carbon monoxide with hexachloroethane to give phosgene and perchloroethylene. This graph provides data which are critical to the successful operation of the process.

As seen by the graph in FIG. 2 the equilibrium constant is favorable in the range of 200° (1/T=0.0021) to 400° C. (1/T=0.0015). The reaction can be operated outside of this range, but the conditions are not nearly so advantageous. At lower temperatures the equilibrium is less favorable. At higher temperatures phosgene begins to decompose in appreciable quantities to carbon monoxide and chlorine. As indicated by equation 2, the number of moles of products equals the number of moles of reactants. Thus, there is no thermodynamic advantage to operating at elevated pressures although engineering considerations may suggest operation at modest pressures.

A number of catalysts may be used to promote the reaction of hexachloroethane with carbon monoxide. The literature has disclosed the use of various catalysts to promote the reaction of chlorine with carbon monoxide. These catalysts include activated charcoal, activated charcoal treated with metallic salts, and platinum. Likewise a catalyst is necessary in the present invention to overcome the activation energy of carbon monoxide. The recommended catalyst is activated carbon although the use of alternative catalysts such as platinum metal may be considered.

Depending on reaction conditions in the chlorination of carbon monoxide with hexachloroethane, some unreacted carbon monoxide may be present in the exit gas. Rather than venting this unreacted gas, it may be recycled to the reactor. Such a recycle loop is not shown in FIG. 1, but this arrangement should not be discounted. Phosgene product is condensed along with the perchloroethylene in the effluent from the second reactor. Phosgene with a boiling point of 7.6° C. can easily be fractionated from perchloroethylene which boils at 121° C.

Phosgene product of the present invention is an intermediate widely used in chemical synthesis. Whatever advancement in its manufacture can be achieved would be significant. Any reduction in cost, increased efficiency in production or improvement in the logistics of its supply would increase the utility of phosgene.

The embodiments of the present invention in which exclusive property or privilege is claimed are defined as follows.

I claim:

1. A process for the production of phosgene comprising the following steps operated in tandem:
   first, reacting perchloroethylene with hydrogen chloride and oxygen in the presence of a first catalyst to give hexachloroethane and water, separating the hexachloroethane, and
   second, reacting the hexachloroethane from the first step with carbon monoxide in the presence of a second catalyst to produce perchloroethylene and phosgene which is separated from the perchloroethylene before the latter is recycled to the first step.

2. A process according to claim 1 in which the source of oxygen is air.

3. A process according to claim 1 in which the first catalyst comprises copper chloride.

4. A process according to claim 1 in which the second catalyst is activated carbon.

5. A process according to claim 1 in which the reaction of the first step is carried out at a temperature in the range of 200° to 375° C.

6. A process according to claim 1 in which the reaction of the second step is carried out at a temperature within the range of 200° to 400° C.

* * * * *